United States Patent [19]

Griffin et al.

[11] Patent Number: 5,005,122

[45] Date of Patent: Apr. 2, 1991

[54] ARRANGEMENT WITH COOPERATING MANAGEMENT SERVER NODE AND NETWORK SERVICE NODE

[75] Inventors: David Griffin, Maynard; Jonathan Campbell, Acton; Michael Reilly, Sterling; Richard Rosenbaum, Pepperell, all of Mass.

[73] Assignee: Digital Equipment Corporation, Maynard, Mass.

[21] Appl. No.: 94,169

[22] Filed: Sep. 8, 1987

[51] Int. Cl.[5] .......................... G06F 9/44; G06F 13/38
[52] U.S. Cl. ................................. 364/200; 364/281.3; 364/284.3; 364/284.4; 370/85.1
[58] Field of Search ... 364/200 MS File, 900 MS File; 370/85, 60, 85.1, 94.1, 94; 340/825.5

[56] References Cited

U.S. PATENT DOCUMENTS

| | | | |
|---|---|---|---|
| 4,635,189 | 1/1987 | Kendall | 364/200 |
| 4,679,191 | 7/1987 | Nelson et al. | 370/84 |
| 4,685,125 | 8/1987 | Zave | 379/96 |
| 4,698,766 | 10/1987 | Intwistle et al. | 364/468 |
| 4,720,850 | 1/1988 | Oberlander et al. | 370/90 |
| 4,747,041 | 5/1988 | Engel et al. | 364/200 |
| 4,780,821 | 10/1988 | Crossley | 364/200 |

*Primary Examiner*—Thomas C. Lee
*Attorney, Agent, or Firm*—Fish & Richardson

[57] ABSTRACT

A network including a plurality of nodes which communicate over a communications link includes client nodes which are used by users and server nodes. At least one of the server nodes is a management server node, and other server nodes may comprise backup server nodes or software distribution server nodes. To initiate, for example, backup service, the management server node transmits a message to the backup server node to enable it to perform the backup. To initiate software distribution service, the management server node determines the nature of the service, such as downloading new versions, auditing use for licensing purposes, and the like, and transmits a message to the software distribution server node to initiate the operation. The network may include master and slave management server nodes, backup server nodes and software distribution server nodes to further divide the control of the respective operations.

11 Claims, 2 Drawing Sheets

ARRANGEMENT WITH COOPERATING MANAGEMENT SERVER NODE AND NETWORK SERVICE NODE

BACKGROUND OF THE INVENTION

1. Field of the Invention

The invention relates generally to the field of digital data processing systems, and more particularly to distributed processing systems in which the various components are interconnected by one or more networks. 2. Description of the Prior Art A digital data processing system, or computer, typically includes a processor, associated memory and input/output units enabling a user to load programs and data into the computer and obtain processed data therefrom. In the past, computers were expensive, and so to be cost effective had to support a number of users. More recently, however, the cost of computers, particularly the processors and memories, has decreased substantially, and so it is relatively cost effective to provide a computer to one or at most only a few users.

A benefit of providing only a single computer for a large number of users was that the users could easily share information. Thus, for example, if all persons working in a bookkeeping or accounting department use a single common computer, they may maintain common accounting and bookkeeping databases up to date, and when necessary accounting reports may be generated from those databases. However, if they use separate computers, the data is stored in separate databases, on each computer, and so generating accounting reports would be more difficult.

As a result, networks were developed to provide a distributed computer system, that is, a system which permits diverse computers to communicate and transfer data among them. In addition, the networks allow the sharing of expensive input/output devices, such as printers and mass storage devices, and input/output devices which may be rarely used, such as links to the public telecommunications network. In a network, each computer is a node which communicates with other nodes over one or several wires. In addition, nodes may be provided which store and manage databases or other data files on mass storage devices, or which manage printers or links to the public telecommunications network.

As networks become larger, however, and more computers, input/output and other devices are connected to them, management of the networks becomes more difficult. To alleviate data transfer limitations when connecting too many nodes to a single network, networks have been divided into a number of smaller, essentially separate networks which are then interconnected by means of bridges or gateways to allow a node on one network to communicate with a node on another network. This alleviates the data transfer limitations of networks, but it does not alleviate management problems.

Two major problems associated with management of a computer system include backup and software management. Backup of data stored on magnetic media, such as a disk, is necessary to minimize the likelihood of data being lost. In backup, data on one node is backed up either on a different node or on another disk or on tape at the same node. Software management consists of a number of functions, including verifying that a user has a correct version, installing new versions as they are obtained, and keeping track of software distribution and use for licensing purposes. In the past, when computer systems were large, multiple user systems, a system manager performed these functions. With the advent of single user systems, such as personal computers and workstations, the users essentially became system managers, requiring them to perform these system management tasks.

In many distributed systems, it is desirable to perform some services, such as backup of individual nodes, automatically at periodic intervals. Such services may be performed, for example, at weekly or monthly time intervals. A problem arises if, because a node is not functioning, backup cannot be performed on the node when it is scheduled. In some systems, if a backup operation cannot be performed, nothing is done until the next time the backup operation is scheduled; the operation is performed at that time if the operation can be performed. In these systems, if a node becomes available at an early time in the next time period, since backup is not performed until the end of the time period, backup is not performed on that node as early as it could be. In other systems, if a backup operation cannot be performed, a backup command is inserted into a task queue, which is periodically examined and the operations in the queue are performed. In these systems, however, several commands to backup a node may be in the task queue, and so backup may be repetitively enabled after the node becomes available.

SUMMARY OF THE INVENTION

The invention provides a new and improved distributed computer system of nodes communicating over a network which provides improved management services, including backup and software distribution, to users of the system, particularly as the network becomes larger and more extensive.

In brief summary, a network including a plurality of nodes which communicate over a communications link includes client nodes which are used by users and server nodes. At least one of the server nodes is a management server node, and other server nodes comprise network service nodes for performing network services. To initiate a network service, the management server node transmits a message to the network service node to enable it to perform an operation. The network service node responds with a status message after the operation has been completed.

The management server node also maintains a task schedule for each node, for automatically performing selected operations such as backup, and at scheduled times enables those operations to occur. In connection with backup, the management server node transmits a message to the backup server node to enable it to perform the required backup operation. The management server node periodically performs a schedule scanner task in which it determines which previously scheduled operations have not been completed and performs those operation.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
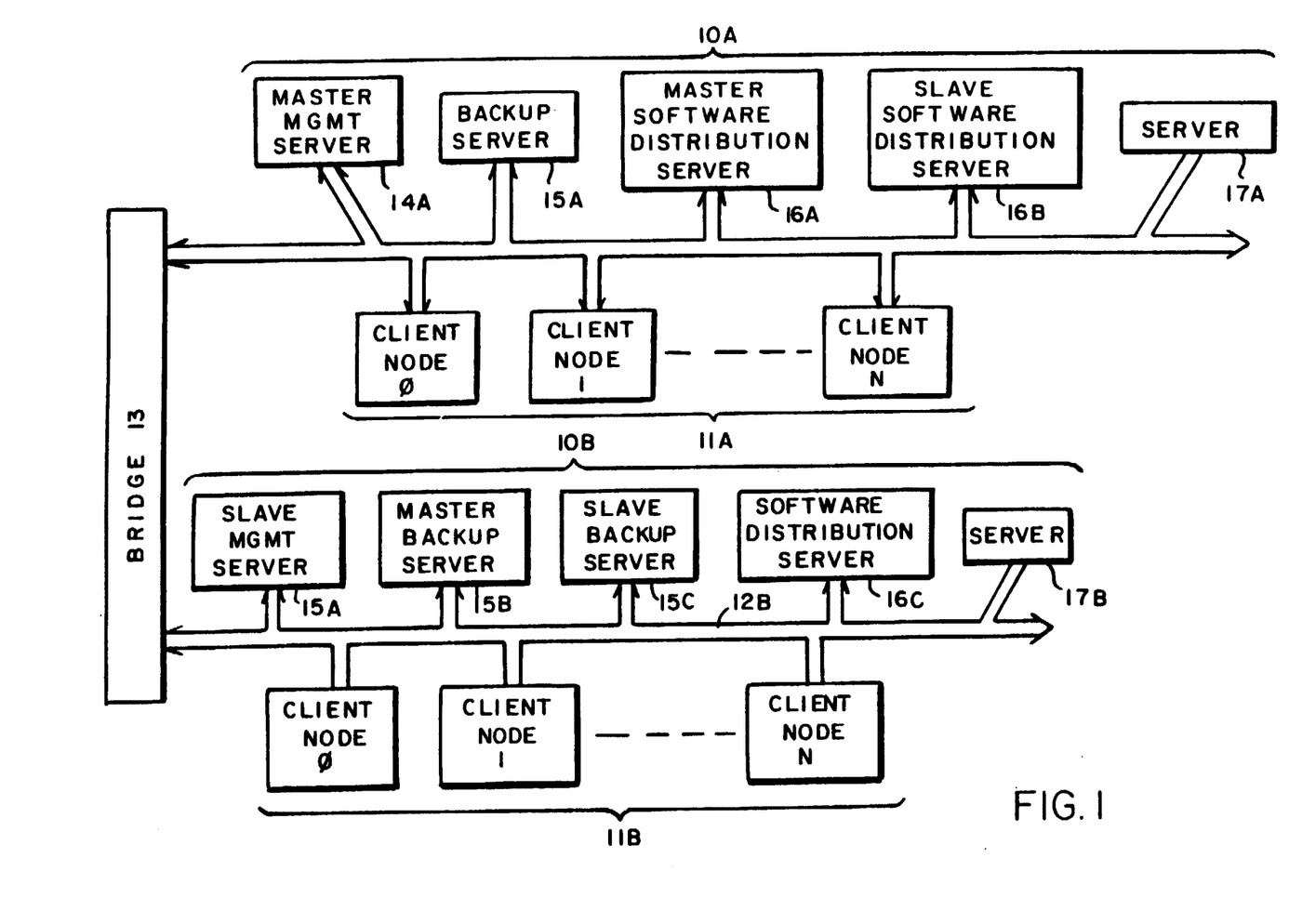
FIG. 1 is a general block diagram of a distributed digital data processing system constructed in accordance with the invention.

FIG. 1 depicts a general block diagram of a distributed digital data processing system constructed in accordance with the invention. With reference to FIG. 1, the system includes a network comprising a plurality of nodes, including server nodes 10A and 10B (generally identified by reference numeral 10) and a plurality of client nodes 11A and 11B (generally identified by reference numeral 11) interconnected by a communications link 12A and 12B (generally identified by reference numeral 12. Nodes 10 and 11 communicate by means of messages transferred over communications links 12 in a conventional manner.

The server nodes 10 provide a number of services to client nodes 11. The client nodes 11 are used by users to perform or initiate data processing. Examples of services provided by server nodes 10 include printing and telecommunications services, data processing, mass storage backup of data which is processed by the client nodes 11 or by a server node 10, and common database control for client nodes 11, allowing a plurality of client nodes to access a common database. It will be appreciated that not all server nodes provide all of such services to the client nodes 10; in some cases, one or only a few server nodes 10 may provide a particular service to the client nodes 11. In addition, some of the server nodes 10 may provide multiple services to the client nodes 11.

The system depicted in FIG. 1 is a wide area network which includes two distinct local area networks each defined by a communications link 12A and 12B. One network includes server nodes 10A, client nodes 11A and communications link 12A, and the other network includes server nodes 10B, client nodes 11B and communications link 12B. The two local area networks may communicate with each other through a network bridge or gateway 13 in a conventional manner. The network bridge 13 effectively isolates the two communications links 12A and 12B to permit communications to occur separately and simultaneously over the two communications links 12A and 12B, except when a node connected to one communications link requires communications with a node connected to the other communications link. When that occurs, the network bridge 13 couples the messages comprising the required communications between the communications links 12A and 12B. A bridge 13 thus permits a large distributed system to be constructed with many server and client nodes without having the communications links overloaded with transfers. It will be appreciated that the system may include additional networks connected to one or the other, or both, of the networks depicted in FIG. 1 through bridges or gateways similar to bridge 13.

The system depicted in FIG. 1 includes three specific types of server nodes, namely management server nodes 14A and 14B (generally identified by reference numeral 14), backup server nodes 15A, 15B and 15C (generally identified by reference numeral 15), and software distribution server nodes 16A, 16B, and 16C (generally identified by reference numeral 16). Management server nodes 14 generally perform management operations, backup server nodes 15 generally perform backup operations, and software distribution server nodes 16 generally maintain copies of selected software programs and distribute copies of the software programs to selected client nodes 11 under control of a management server 14. Other server nodes, identified by reference numeral 17A and 17B (generally identified by reference numeral 17) perform other types of services, such as data processing, communications over the public telecommunications network, and so forth. It will be appreciated that, depending on the expected work load of a server node 10, a single server node may comprise any combination of a management server node 14, a backup server node 15, a software distribution server node 16 and/or another server node 17.

The system depicted in FIG. 1 includes two management nodes 14A and 14B. One of the management nodes, namely management node 14A, is a master management node, and the other management node 14B is a slave management node. The system may also include additional slave management nodes connected to one or the other of communications links 12A or 12B, or to a communications link 12 in another network.

The system depicted in FIG. 1 includes three backup server nodes 15A, 15B and 15C, one of which, namely backup server node 15A, is connected to communications link 12A, and two of which, namely nodes 15B and 15C, are connected to communications link 12B. Backup server node 15B is a master backup server node and backup server node 15C is a slave backup server node. While communications link 12A is shown as being connected to one backup server node, namely node 15A, additional backup server nodes may be connected to the communications link 12A, in which case one of the backup server nodes may be a master backup server node and the other backup server nodes may be slave backup server nodes. Alternatively, all of the backup server nodes connected to a communications link 12 may be coordinate, that is, neither master nor slave backup server nodes.

The system depicted in FIG. 1 also includes three software distribution servers 16A, 16B and 16C, two of which, namely software distribution server nodes 16A and 16B, are connected to communications link 12A, and one of which, namely node 15C, is connected to communications link 12B. Software distribution server node 16A is a master software distribution server node and software distribution server node 16B is a slave software distribution server node. While communications link 12B is shown as being connected to one software distribution server node, namely node 16C, additional software distribution server nodes may be connected to the communications link 12B or communications links 12 in other networks, in which case one of the software distribution server nodes may be a master software distribution server node and the other software distribution server nodes may be slave software distribution server nodes. Alternatively, all of the software distribution server nodes connected to a communications link 12 may be coordinate, that is, neither master nor slave software distribution server nodes.

A management server node 14 performs management services for managing network operations, including enabling a backup server node 15 to perform backup services or a software distribution server node 16 to perform software distribution services. In connection with backup, a management server node 14 enables a backup operation in response to a backup initiation message from a management server node 14, perhaps in response to an automatic backup enabled by a task scheduler scanner as explained below, or a backup request message from the client node 11.

In connection with distribution of software, a management server node 14 enables distribution and installation of a software program by a software distribution server 16 in response to a software distribution initiation message from a management server node 14 or a software distribution request message from a client node 11. Each software distribution server 16 maintains copies of such software programs as will most likely be required by the client nodes connected to the communications link 12 to which the software distribution server 16 is connected. That is, if the client nodes 11A are used in an accounting department and client nodes 11B are used in an engineering department, the software distribution servers 16A and 16B may maintain accounting programs and software distribution servers 16C may maintain engineering and design programs. If a client node 11B requires an accounting program, that may be obtained from a software distribution server node 16A or 16B, if distribution of the software program to the client node 11B is permitted.

More specifically, when a client node 11 requires a software program, a management server 14 which may either be connected to the communications link 12 to which the client node 11 is connected or to another communications link 12, transmits a software distribution enabling message to the software distribution server 16, or alternatively the client node requiring the program itself may transmit a software distribution request message to a management server 14. If, in response to a software distribution request message the management server 14 determines that the client node 11 is permitted to use the software program, the management server 14 transmits a software distribution enabling message to the software distribution server 16 which maintains copies of the software program. In response to the software distribution enabling message, the software distribution server 16 transmits in a message a copy of the requested software program to the client node 11, installs the program on the client node, performs any compilation and linking which may be required to make the program usable, installs or modifies data structures on the client node 11, and so forth. Thereafter, the software distribution server node 16 returns a status message to the management server node 14 which enables the software distribution operation reporting success or failure of the operation.

If a system includes a master software distribution server 16A and slave software distribution server 16B, only one or both of the software distribution servers 16A and 16B may actually be able to download and install a copy of a particular software program. In either case, the master software distribution server 16A receives the software distribution enabling message. If only the master software distribution server 16A maintains a copy of the software program, it will perform the software distribution operation with the requesting client node 11. On the other hand, if only the slave software distribution server 16B maintains a copy of the software program, the master software distribution server 16A will transmit a message to the slave software distribution server 16B enabling it to perform the software distribution operation.

Finally, if both the master software distribution server 16A and the slave software distribution server 16B maintain copies of the required software program, the master software distribution server 16A may perform the software distribution operation. Alternatively, the master software distribution server may enable, by means of a message transmitted over the communications link 12, the slave software distribution server 16B to perform the software distribution operation. The determination by the master software distribution server 16A of whether it will perform the software distribution operation or enable the slave software distribution server 16B to perform it may depend on their relative work loads at the time the master software distribution server 16A receives the enabling message from the management server node 14, the network topology, the message traffic over the communications link 12, and so forth. In any case, following the software distribution operation, the master software distribution server 16A returns a status message to the management server 14 reporting success or failure of the operation. Alternatively, the slave software distribution server 16B may return the status message directly to the management server node 14.

It will be appreciated that there may be software distribution server nodes 16 which operate in response to messages from slave software distribution server node 16C and which transmit status messages to software distribution server node 16C. Thus, the software distribution server nodes 16 may effectively form a hierarchy in connection with the distribution of software programs and in reporting of status by way of status messages.

Similarly, either independently or in response to a backup request message from a client node 11, a management server node 14 enables a backup server 15 to engage in a backup operation. Typically, each backup server 15 will be assigned to perform backup operations for selected client nodes 11. When a client node 11 requires a backup operation, it transmits a backup request message to a management server 14, which may either be connected to the communications link 12 to which the client node 11 is connected or to another communications link 12. The management server 14 transmits a backup enabling message to a backup server 16 which is responsible for backup in connection with the client node 11. That is, the backup server node 15 may either actually perform the backup operation, or it may be a master backup server node 15B which enables a slave backup server node 15C, which is actually responsible for performing the backup operation in connection with the client node 11, to perform the backup operation. Upon completion of the backup operation, the backup server 15 transmits a status message to the management server 14 indicating success or failure of the backup operation. If a slave backup server 15C performs the backup operation, it transmits a status message indicating success or failure of the operation either directly to the management server node which initiated the backup operation, or to its master backup server 15B, which in turn transmits a status message to the management server 14. It will be appreciated that there may be backup server nodes 15 which operate in response to messages from slave backup server node 15B and which transmit status messages to backup server node 15B. Thus, the backup server nodes 15 may effectively form a hierarchy in connection with the performance of backup operations and in reporting of status by way of status messages.

As described above, the management servers 14 enable automatic backup operations at a client node 11 to periodically occur, typically on a daily, weekly or monthly basis. Periodic backup operations are staggered during a week or month so that not all client nodes 11 are backed up at the same time. Automatic backup operations with respect to some client nodes 11 are typically enabled daily, and if an automatic backup operation cannot be performed when scheduled, the management servers perform the operations described below in connection with FIG. 2 to perform the automatic backup operations when they can be performed.

It will be appreciated that a system constructed in accordance with the invention includes at least one management server 14, and it may also include additional management servers 14. The system depicted in FIG. 1 includes two management servers, namely master management server 14A and slave management server 14B. The master management server 14A may enable the slave management server to provide management services, that is controlling backup and software distribution services in connection with selected client nodes 11 and receiving status messages in response thereto. Either periodically or following the provision of the services and receipt of the status messages, the slave management server 14B transmits summary status information to its master management server 14A. There may be additional slave management servers 14 which report directly to the master management server 14A or to other slave management servers, so as to effectively form a hierarchy of management servers 14.

The new system effectively permits the expansion of the system through the addition of client nodes 11, while maintaining the management, backup and software distribution services provided by management server nodes 14, backup server nodes 15 and software distribution server nodes 16. Thus, if client nodes 11 are added to the system, either to the existing communications links 12 or to additional communications links 12 connected to the original communications links 12 through gateways or bridges 13, the level of services may be maintained by adding slave management server nodes 14B, and backup server nodes 15 and software distribution server nodes 16, either under direct control of a management server node 14 or a master backup server node 15B or master software distribution server node 16A, as needed.

Figure 2:
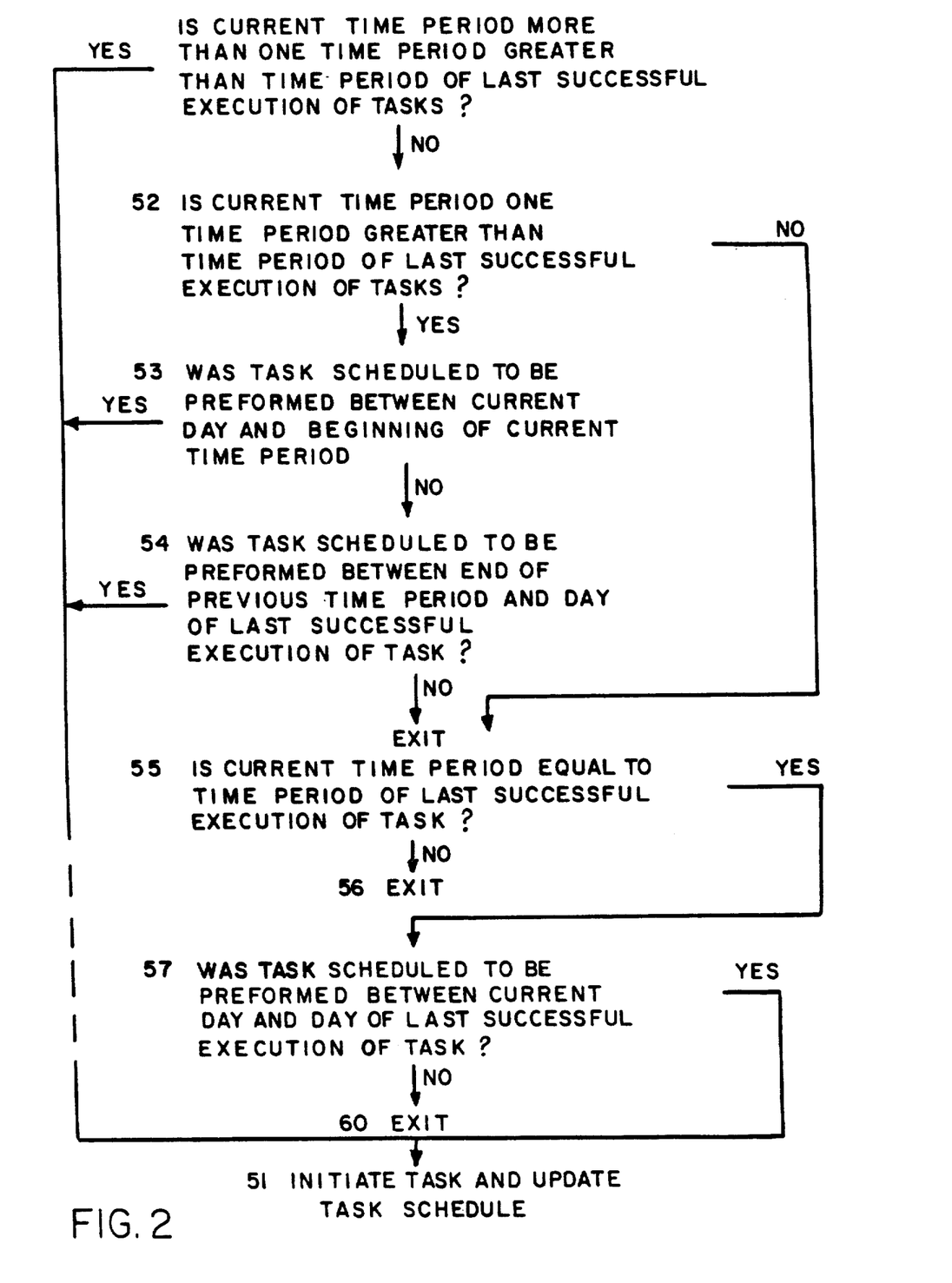
FIG. 2 is a flow diagram of a schedule scanner task used in the system depicted in FIG. 1.

As described above, a management server node 14 periodically enables an automatic operation, such as backup operations, in connection with client nodes. Under some circumstances, if the management server node 14 is unable to perform an automatic operation in connection with a client node 11 when scheduled, it is desirable to enable the management server node 14 to retry the operation, but to do so in such a manner as to ensure that the operation is not performed more than once even if multiple periods have passed. FIG. 2 depicts a task schedule scanner which is used for scanning scheduled tasks and which ensures that a task which was previously scheduled but which could not be completed is not performed more than once.

Preliminarily, the management server node 14 using the task schedule scanner maintains a scheduling table including a plurality of entries. Each entry includes a number of fields, including a task identification field, a field indicating when the operation was last performed and a field indicating when the operation is next scheduled to be performed. The management server node 14 may maintain separate tables for each time period, that is, a table for tasks to be performed daily, a second table for tasks to be performed weekly and a third table for tasks to be performed monthly. Alternatively, the management server node 14 may maintain a common table and include another field in each entry which indicates the period of repetition of the task identified by the entry.

With reference to FIG. 2, in executing the task schedule scanner in connection with a task in the scheduling table, the management server node 14 first determines whether the current time period, that is, the current day, week or month, depending on whether the task is to be performed daily, weekly or monthly, is more than one time period greater than the time period of the last successful execution of the task (step 50). If it is, the management server node 14 initiates execution of the task and, after receipt of a status message indicating success of the operation, updates the task schedule entry associated with the task to indicate the day the task was executed and the day of next scheduled execution (step 51).

If, in step 50 the management server node 14 determines that the current time period is not more than one time period greater than the time period of the last successful execution of the task, it sequences to step 52, in which it determines if the current time period is one time period greater than the time period of the last successful execution of the task. If it is the management server node 14 determines whether the task was scheduled to be performed between the current day and the beginning of the current time period (step 53) or between the end of the previous time period and the day of the last successful execution of the task (step 54). If either steps 53 or 54 result in a positive determination, the management server node 14 sequences to step 51 to initiate execution of the task and updating of the task entry in the schedule table.

If both of steps 53 and 54 result in negative determinations, or if in step 52 the management server node 14 determined that the current time period is not one time period greater than the time period of the last successful execution of the task, the management server node 14 sequences to step 55. In step 55, the management server node 14 determines whether the current time period is equal to the time period of the last successful execution of the task. If not, the management server node 14 exits (step 56), and notes the occurrence of an error. If, the current time period does equal the time period of the last successful execution of the task, the management server node 14 determines whether the task was scheduled to be performed between the current day and the last successful execution of the task (step 57). If not, the management server node 14 exits (step 60), but if it is, the management server node 14 initiates execution of the task and, after receipt of a status message indicating success of the operation, updates the entry in the task schedule table associated with the task.

It will be appreciated that the task schedule scanner depicted in FIG. 2 ensures that a task, which could not be performed when scheduled, is performed at as early a scan as possible since the task schedule table is repeatedly scanned on a timely basis as determined by a system operator. Thus, for example, a task to be executed weekly which cannot be performed when scheduled is not delayed until the next week; the task is executed, if it can be, the next time the task schedule is scanned. In addition, the task is executed without repetition, as can occur if tasks which cannot be executed are placed in queues.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A network including a client node and a plurality of server nodes interconnected by a communications link, at least one of said server nodes comprising a management server node and at least another one of said server nodes comprising a network service node for performing a network service with respect to said client node,
   A. said management server node including:
      i. a network service initiator arranged to transmit a network service initiation message for initiating a network service with respect to said client node;
      ii. a network status maintainer arranged to receive a status message from said communications link and to maintain the status of said network service in response thereto; and
      iii. a management server controller connected to said network service initiator and said network status maintainer and arranged to control the network service initiator to initiate said network service in response to the received status messages;
   B. said network service node including:
      i. a network service operator arranged to perform said network service with respect to said client node;
      ii. a network service enabler connected to said communications link and said network service operator and arranged to receive the network service initiation message from said communications link and to enable said network service operator to operate in response to the receipt of said network service initiation message; and
      iii. a status message generator connected to said communications link and to said network service operator and arranged to generate said status message identifying the status of an operation performed by said network service operator and to transmit said status message over said communications link.

2. A network as defined in claim 1 further comprising a master management server node connected to said communications link;
   A. said master management server node comprising:
      i. a master network service initiator arranged to generate a master network service initiation message and to transmit said master network service initiation message over said communications link to said management server node for controlling the management server node;
      ii. a master network status maintainer arranged to receive a master status message from said management server node regarding said network services and to maintain the status of said network service in response thereto; and
      iii. a master management server controller connected to said master network service initiator and said master network status maintainer and arranged to control the master network service initiator to initiate said network service in response to the received master status message;
   B. said management server controller further comprising:
      i. a master network service initiation message receiver arranged to receive said master network service initiation message from said communications link and to control the network service initiator in response to the received master network service initiation message; and
      ii. a master network service status message generator arranged to generate said master status message and to transmit said master status message over said communications link to said master network status maintainer.

3. A network as defined in claim 1 wherein said network service operator further including a transmitter arranged to transmit slave network service initiation message over said communication link, said network further comprising a slave network service node including:
   A. a slave network service operator arranged to perform said network service with respect to said client node;
   B. a slave network service enabler connected to said slave network service operator and arranged to receive said slave network service initiation message from said communications link and to enable said slave network service operator to operate in response to the receipt of said slave network service initiation message; and
   C. a slave status message generator connected to said slave network service operator and arranged to generate a slave status message identifying the status of an operation performed by said slave network service operator and to transmit said slave status message over said communications link.

4. A network as defined in claim 1 wherein said management server node further includes a task scheduling scanner arranged to time the scheduling of network services, said management server controller also operating in response to said task scheduling scanner.

5. A network as defined in claim 4 wherein said task scheduling scanner includes:
   A. a task schedule table including an entry associated with each said task, each entry identifying a last time the task was performed; and
   B. a determiner arranged to determine, for each said entry, whether the task was scheduled to be previously performed.

6. A network including a client node and a plurality of server nodes interconnected by a communications link, at least one of said server nodes comprising a management server node and at least another one of said server nodes comprising a network service node for performing a network service with respect to said client node,
   A. said management server node including:
      i. a network service initiator arranged to transmit a network service initiation message for initiating a network service with respect to said client node;
      ii. a network status maintainer arranged to receive a status message from said communications link and to maintain the status of said network service in response thereto; and iii. a management server controller connected to said network service initiator and said network status maintainer and arranged to control the network service initiator to initiate said network service in response to the received status messages;

B. said network service node including:
  i. a network service operator arranged to perform a network service with respect to said client node;
  ii. a network service enabler connected to said communications link and said network service operator and arranged to receive the network service initiation message from said communications link and to enable said network service operator to operate in response to the receipt of a network service initiation message; and
  iii. a status message generator connected to said communications link and to said network service operator and arranged to generate said status message identifying the status of an operation performed by said network service operator and to transmit said status message over said communications link, said network further comprising a master management server node connected to said communications link, A. said master management server node comprising:
  i. a master network service initiator arranged to generate a master network service initiation message and to transmit said master network service initiation message over said communications link to said management server node for controlling the management server node;
  ii. a master network status maintainer arranged to receive a master status message from said management server node regarding said network services and to maintain the status of said network service in response thereto; and
  iii. a master management server controller connected to said master network service initiator and said master network status maintainer and arranged to control the master network service initiator to initiate said network services in response to the received master status message;

B. said management server controller further comprising:
  i. a master network service initiation message receiver arranged to receive said master network service initiation message from said communications link and to control the master network service initiator in response to the received network service initiation message; and
  ii. a master network service status message generator arranged to generate said master status message and to transmit said master status message over said communications link to said master network status maintainer;

said network service operator further including a transmitter arranged to transmit a slave network service initiation message over said communications link, said network further comprising a slave network service node including:

A. a slave network service operator arranged to perform said network service with respect to said client node;

B. a slave network service enabler connected to said slave network service operator and arranged to receive said slave network service initiation message from said communications link and to enable said slave network service operator to operate in response to the receipt of said slave network service initiation message; and C. a slave status message generator connected to said slave network service operator and arranged to generate a slave status message identifying the status of an operation performed by said slave network service operator and to transmit said slave status message over said communications link, and wherein said management server node further includes a task scheduling scanner arranged to time the scheduling of network services, said management server controller also operating in response to said task scheduling scanner.

7. A method for managing the performance of a network service for a client node connected to a network including server nodes, said client node and server nodes being interconnected by a communications link, at least one of said server nodes comprising a management server node and at least another one of said server nodes comprising a network service node for performing said network service with respect to said client node, said method comprising the steps of:

A. generating a network service initiation message from said management server node for initiating said network service with respect to said client node and transmitting said network service initiation message over said communications link;

B. receiving status message from said communications link and maintaining in said management sever node the status of said network service in response thereto;

C. initiating from said management server node network service in response to the received status message;

D. receiving in said network service node said network service initiation message from said communications link, E. performing in said network service node, said network service with respect to said client node in response to said network service initiation message; and F. generating in said network service node said status message identifying the status of said network service and transmitting said status message over said communications link.

8. The method of claim 7 wherein said network having a master management server node connected to said communications link, said method further comprising the steps of:

A. generating a master network service initiation message from said master management server node and transmitting said master network service initiation message over said communications link to said management server node for controlling said management server node;

B. receiving at said master management server node a master status message from said management server node regarding said network service and maintaining the status of said network service in response thereto;

C. receiving at said management server node said master network service initiation message from said communications link and in said master management server node, initiating said network service in response thereto; and E. generating from said management server node said master status message and transmitting said status message over said communications link to said master management server node.

9. The method of claim 7 wherein said network having a slave network service node connected to said communications link, said method futher comprising the steps of:
   A. transmitting from said network service node a slave network service initiation message over said communications link;
   B. performing in said slave network service node said network service with respect to said client node;
   C. receiving at said slave network service node said slave network service initiation message from said communications link and enabling said slave network service node to operate in response to the receipt of said slave network service initiation message; and
   D. generating from said slave network service node a slave status message identifying the status of an operation performed by said slave network service node and transmitting said status slave message over said communications link.

10. The method of claim 7 further comprising timing from said management server node the scheduling of network services to control the generation of said network service initiation message.

11. The method of claim 10 further comprising
   A. tabulating in said management server node network service tasks and a last time each said task was performed; and
   B. determining in said management server node for each said network service task whether the task was scheduled to be previously performed.

* * * * *

UNITED STATES PATENT AND TRADEMARK OFFICE
CERTIFICATE OF CORRECTION

PATENT NO. : 5,005,122

DATED : April 2, 1991

INVENTOR(S) : Griffin et al.

It is certified that error appears in the above-identified patent and that said Letters Patent are hereby corrected as shown below:

Col. 1, line 11; insert new paragraph before "2."

Col. 8, line 29; insert --,-- after "is".

Col. 9, line 65; "services" should be --service--.

Col. 10, line 20; insert --a-- before "slave".

Col. 11, line 8; "a" should be --said--.

Col. 11, line 16; "a" should be --said--.

Col. 11, line 43; "services" should be --service--.

Col. 12, line 35; "from" should be --in--.

Col. 12, line 35; insert said-- before "net".

Col. 13, line 2; insert --master-- before "status" (second occurrence).

UNITED STATES PATENT AND TRADEMARK OFFICE
CERTIFICATE OF CORRECTION

PATENT NO. : 5,005,122

DATED : April 2, 1991

INVENTOR(S) : David Griffin, et al.

It is certified that error appears in the above-identified patent and that said Letters Patent is hereby corrected as shown below:

Column 14, line 9, "from" should be --in--.

Signed and Sealed this

Seventeenth Day of August, 1993

*Attest:*

BRUCE LEHMAN

*Attesting Officer*     *Commissioner of Patents and Trademarks*